United States Patent
Kunimochi

(10) Patent No.: US 7,278,772 B2
(45) Date of Patent: Oct. 9, 2007

(54) SPREAD ILLUMINATING APPARATUS

(75) Inventor: Toru Kunimochi, Iwata-gun (JP)

(73) Assignee: Minebea Co., Ltd., Nagano (JP)

( * ) Notice: Subject to any disclaimer, the term of this patent is extended or adjusted under 35 U.S.C. 154(b) by 40 days.

(21) Appl. No.: 11/140,956

(22) Filed: Jun. 1, 2005

(65) Prior Publication Data

US 2005/0270799 A1 Dec. 8, 2005

(30) Foreign Application Priority Data

Jun. 3, 2004 (JP) ............................. 2004-166071

(51) Int. Cl.
*F21V 8/00* (2006.01)
(52) U.S. Cl. ...................... 362/619; 362/620; 362/561
(58) Field of Classification Search ................ 362/619, 362/612, 625, 626, 620, 561; 385/129, 146, 385/130, 131; 349/64, 65
See application file for complete search history.

(56) References Cited

U.S. PATENT DOCUMENTS 5,381,309 A * 1/1995 Borchardt ................... 362/612
5,779,337 A * 7/1998 Saito et al. ................. 362/619
6,578,977 B2 * 6/2003 Egawa et al. ............... 362/610
2002/0015300 A1 2/2002 Katsu et al.
2002/0051355 A1 5/2002 Egawa et al.
2003/0034445 A1 2/2003 Boyd et al.

FOREIGN PATENT DOCUMENTS

JP A 2004-6187 1/2004
WO WO 01/27527 A1 4/2001

* cited by examiner

*Primary Examiner*—Sharon Payne
(74) *Attorney, Agent, or Firm*—Oliff & Berridge PLC

(57) ABSTRACT

A spread illuminating apparatus includes at least one spot light source; and a light conductive plate which has the at least one spot light source disposed at one end surface thereof, and which has a plurality of ridges formed on at least one of two major surfaces thereof and extending from the one end surface toward another end surface opposite to the one end surface. The plurality of ridges are configured to meander.

6 Claims, 6 Drawing Sheets

PRIOR ART

PRIOR ART

SPREAD ILLUMINATING APPARATUS

BACKGROUND OF THE INVENTION

1. Field of the Invention

The present invention relates to a spread illuminating apparatus as a lighting means for a liquid crystal display apparatus, and the like, and more particularly to a side-light type spread illuminating apparatus using a spot light source.

2. Description of the Related Art

Recently, a liquid crystal display (LCD) apparatus is extensively used as a display device for electronic equipments, such as a personal computer, a cellular phone, and the like. Unlike a cathode-ray tube (CRT), a liquid crystal does not emit light by itself, and therefore, for example, a light transmission type LCD apparatus requires a lighting means to illuminate a liquid crystal panel from behind, and a semi-transmission type LCD apparatus, which utilizes outside light, requires an auxiliary lighting means when used in the dark. A side-light type spread illuminating apparatus, which generally includes a light conductive plate and a light source disposed at a side surface of the light conductive plate, is advantageous in achieving a low profile, and therefore is preferably used as a lighting means for an LCD apparatus. In such a side-light type spread illuminating apparatus, a line light source, such as a cold-cathode discharge lamp, is conventionally used.

Under the circumstances, recently, a white light emitting diode comes up with an enhanced performance, and is increasingly employed in place of the line light source for purpose of achieving a smaller dimension, a lower profile, and a reduced power consumption.

FIG. 5 shows a spread illuminating apparatus 100 which generally includes a light conductive plate 101, a plurality (three in the figure) of light emitting diodes (LED's) 102, and a prism sheet 103. The spread illuminating apparatus further includes a reflection plate for the LED's 102, a reflection plate disposed under the light conductive plate 101, and a housing frame, but these components are omitted in FIG. 5.

The light conductive plate 101 is a plate-like member formed of a transparent resin material, such as methacrylic resin, polycarbonate resin, or the like, defines a light exit surface 101a, a light refection surface 101b opposite to the light exit surface 101a, and a light entrance surface 101c. The light exit surface 101a has a plurality of triangular prisms extending orthogonally to the light entrance surface 101c and arrayed at a constant interval, and the light reflection surface 101b has a light reflecting means to regularly or irregularly reflect light toward the light exit surface 101a so that at least some part of the reflected light impinges on the light exit surface 101a at an incidence angle smaller than a critical angle.

The prism sheet 103 is a sheet-like member formed of a transparent resin material, for example, a polyethylene terephthalate (PET) film, and defines a major surface 103a having a plurality of triangular prisms formed of methacrylic resin, polycarbonate resin, or the like, and extending in one direction The prism sheet 103 is disposed on the light conductive plate 101 such that the major surface 103a opposes the light exit surface 101a with their respective triangular prism arrays extending orthogonally to each other.

In the spread illuminating apparatus 100, a primary light source is constituted by an array of the plurality of LED's 102 which are spot lights. Such a light source, unlike a line light source adapted to emit light with a relatively uniform brightness across its longitudinal direction, involves a non-uniform brightness distribution with respect to its array direction with brightness peaks appearing in front of respective LED's 102. As a result, light exiting from the spread illuminating apparatus 100 suffers an uneven brightness attributed to the non-uniform brightness distribution, unless some measures are taken to deal with the non-uniformity.

In the spread illuminating apparatus 100 using one piece of prism sheet (the prism sheet 103) in FIG. 5, when a viewer observes the light conductive plate 101 from the side of the light exit surface 101a, light is viewed as radiated in a substantially uniform manner on the whole. However, it happens that emission lines H configuring a V-letter appear at respective LED's 102 as shown in FIG. 6 (schematically illustrated with exaggeration), which results in a significantly deteriorated lighting quality. Such a problem occurs when a regular reflection means, for example, a prism projection pattern, is provided on the front or rear major surface of the light conductive plate 101, while it does not happen when an irregular reflection means, for example, dotted projection pattern, is provided The emission lines H appear due to the LED's 102 used as a light source in place of a cold-cathode discharge lamp. The mechanism of development of the emission lines H is not definitely found out yet, but the problem is attributed to the LED's 102 having a directivity, and to that light traveling in the light conductive plate 101 is apt to be reflected at prism projections located close to the light entrance surface 101c so as to proceed in a specific direction toward the light exit surface 101a. This is pointed out in, for example, Japanese Patent Application Laid-Open No. 2004-6187, paragraphs [0006], and [0070] through [0073].

In order to deal with the problem described above, the aforementioned Japanese Patent Application Laid-Open No. 2004-6187 discloses a spread illuminating apparatus, in which a light reflection surface of a light conductive plate has a plain flat area covering a certain distance from a light entrance surface and then has a prism structure with its prism protrusion dimension varying according to the distance from the light entrance surface. However, fabricating such a light reflection surface is troublesome taking a lot of time and work thus pushing up the cost.

SUMMARY OF THE INVENTION

The present invention has been made in light of the above problem, and it is an object of the present invention to provide a spread illuminating apparatus which includes a light conductive plate with a modified prism configuration.

In order to achieve the object, according to an aspect of the present invention, a spread illuminating apparatus comprises at least one spot light source and a light conductive plate having the at least one spot light source at one end surface thereof, and having a plurality of ridges formed on at least one of two major surfaces thereof and extending from the one end surface toward another end surface opposite to the one end surface. The plurality of ridges are configured to meander.

In the aspect of the present invention, the plurality of ridges may meander in accordance with an identical periodic function.

In the aspect of the present invention, the plurality of ridges may be each arranged so as to be non-parallel to any adjacent ridge.

In the aspect of the present invention, the plurality of ridges may have their maximum inclination angle ranging between 1 and 25 degrees.

Since the plurality of ridges formed on the at least one of two major surfaces of the light conductive plate are configured to meander thereby diffusing the directions of light rays exiting from the light exit surface of the light conductive plate, non-uniformity of brightness in the spread illuminating apparatus is resolved. Especially, emission lines often perceived near the light entrance surface of the light conductive plate are eliminated.

BRIEF DESCRIPTION OF THE DRAWINGS

FIGS. 4A and 4B are cross-sectional views of FIG. 1 taken along line A-A, wherein FIG. 4A shows that the ridges have an identical shape in cross section, and FIG. 4B shows that the ridges have respective different shapes in cross section;

DETAILED DESCRIPTION OF THE PREFERRED EMBODIMENT

The present invention will be described with reference to the accompanying drawings.

Figure 1:
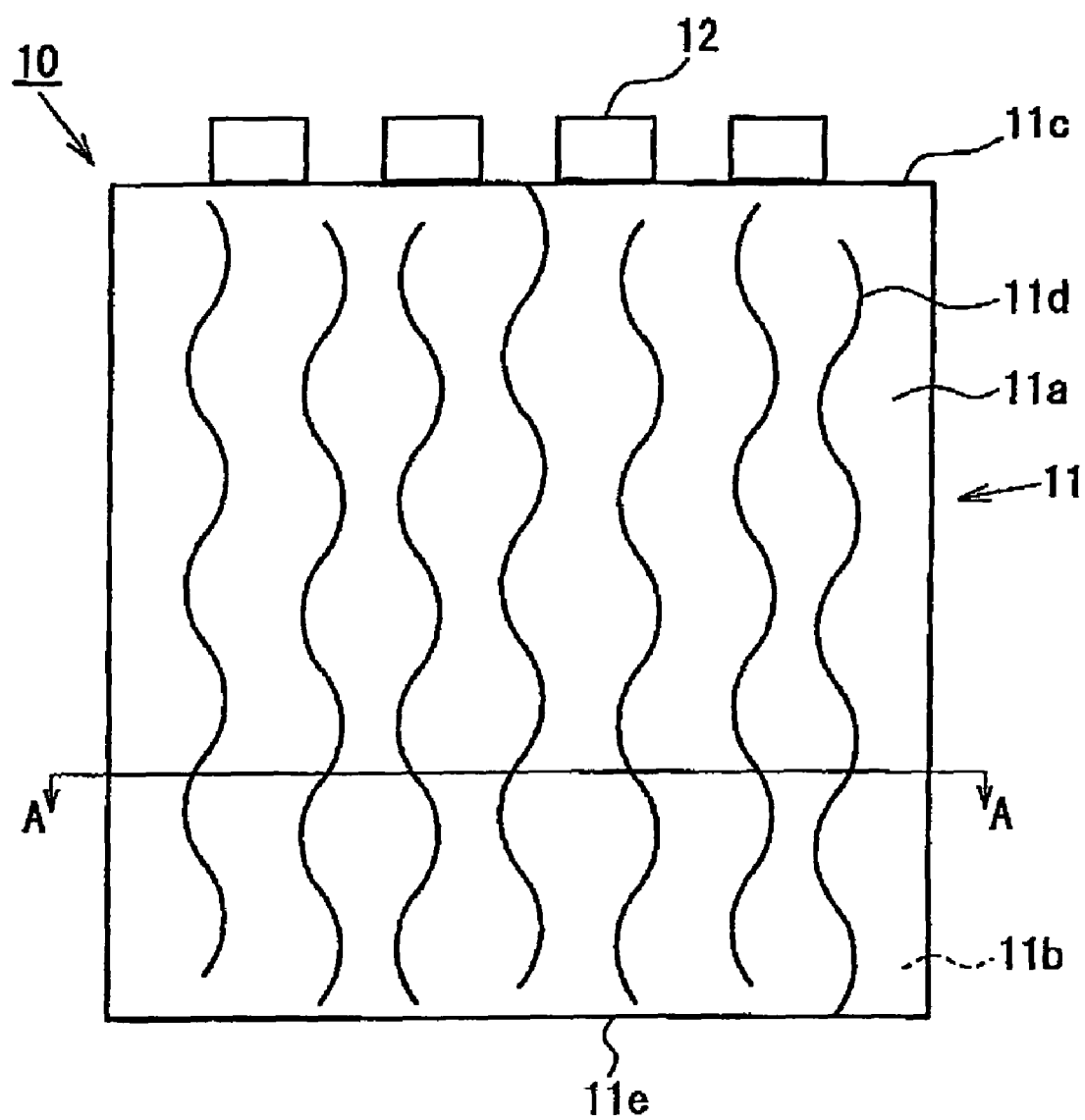
FIG. 1 is a schematic plan view of a relevant part (a plurality of ridges formed on a light conductive plate) of a spread illuminating apparatus according to an embodiment of the present invention.

Referring to FIG. 1, in a spread illuminating apparatus 10 according to an embodiment of the present invention, a plurality (four in the figure) of spot light sources 12 are disposed at a light entrance surface 11c of a light conductive plate 11. The spot light sources 12 are white LED's in the present embodiment, and the light conductive plate 11 is a plate-like member formed of a transparent resin material, preferably methacrylic resin, polycarbonate resin, polystyrene resin, polyolefin resin, amorphous polyolefin resin, polyester resin, transparent fluorocarbon resin, epoxy resin, and the like.

Figure 2:
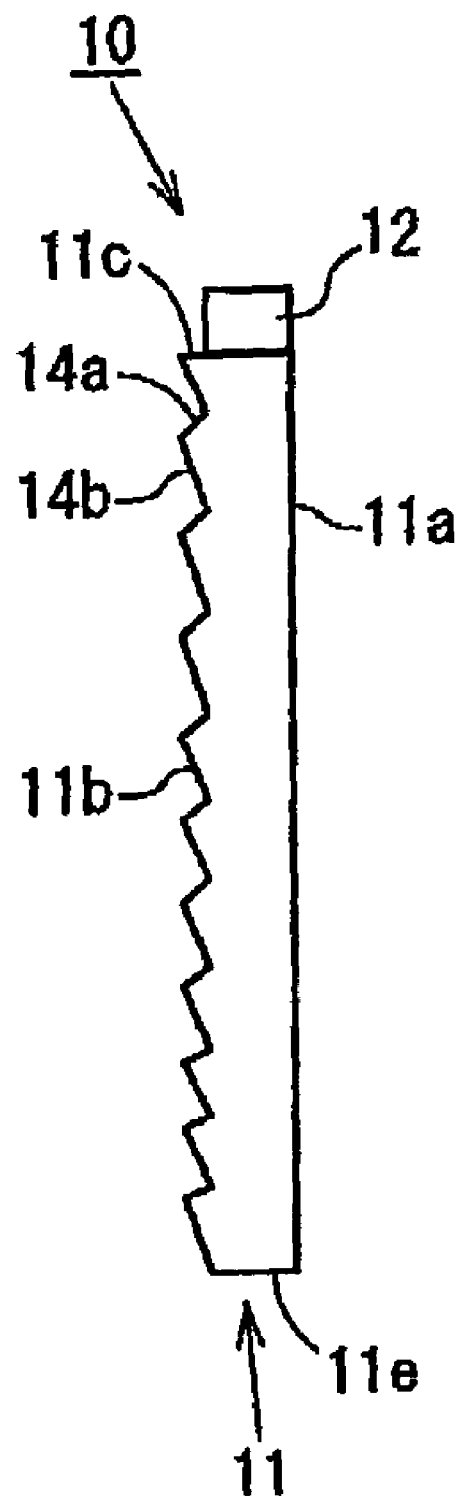
FIG. 2 is a side view of FIG. 1.

The spot light sources 12 are arrayed in a line parallel to the light exit surface 11c. On a light exit entrance 11a of the light conductive plate 11, a plurality of ridges 11d extending in the direction substantially orthogonal to the light entrance surface 11c are formed in a meandering manner as shown in FIG. 1.

referring to FIG. 2, a regular reflection means which includes a plurality of paired inclined surfaces 14a and 14b extending in the direction parallel to the light entrance surface 11c and arrayed in the direction orthogonal to the light entrance surface 11c is provided on a light reflection surface 11b of the light conductive plate 11 opposite to the light exit surface 11a. The inclination angles, dimensions, and arrangement intervals of the inclined surfaces 14a and 14b are appropriately determined in view of uniformity of brightness distribution according to the distance from the light entrance surface 11c. The light conductive plate 11 may have a wedge shape in cross section, specifically such that the thickness of the light conductive plate 11 decreases with an increase of the distance from the light entrance surface 11 toward a surface 11e opposite to the light entrance surface 11c.

Figure 3:
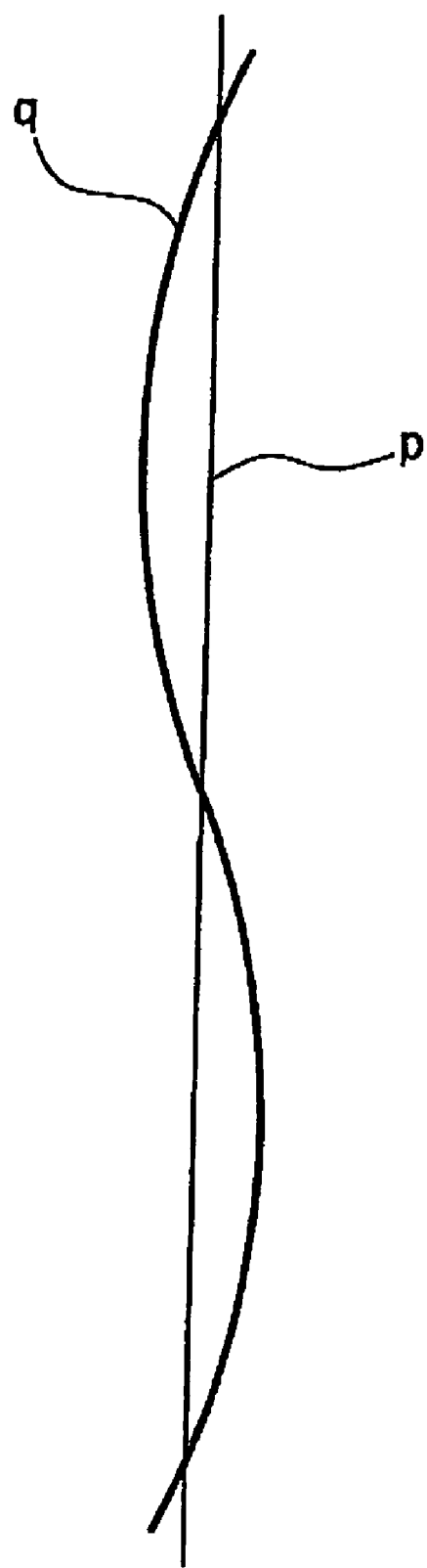
FIG. 3 is an explanatory view of one of the ridges shown in FIG. 1.

The plurality of ridges 11d will be discussed with reference to FIG. 3 showing one ridge 11d thereof. A straight line p is a virtual line oriented in the direction orthogonal to the light entrance surface 11c, and a winding line q represents the crest line of the one ridge 11d. Each of the ridges 11d formed on the light exit surface 11a has its crest line (the winding line q) inclined with respect to the straight line p. In this connection, the maximum inclination angle made by the winding line q with respect to the straight line p preferably arranges between 1 and 25 degrees. The crest line of each ridge 11d may be a winding line to meander according to a specific periodic function, and the winding line q in FIG. 3 is represented as a line curve defining a zero amplitude on the straight line p, where the winding line q has its maximum inclination angle at the cross point with the straight line p.

The ridges 11d may be represented by winding lines formed different from one another in amplitude, period, and configuration defined according to different periodic functions, or defined independently of any periodic functions, but are preferably represented by winding lines formed identical according to one same periodic function with their respective phases shifted so that at least two adjacent winding lines are shifted in phase from each other (non-parallel to each other). In this connection, the winding lines may be shifted in phase in a regular or random manner.

Figure 4A:
Figure 4B:
Figure 5:
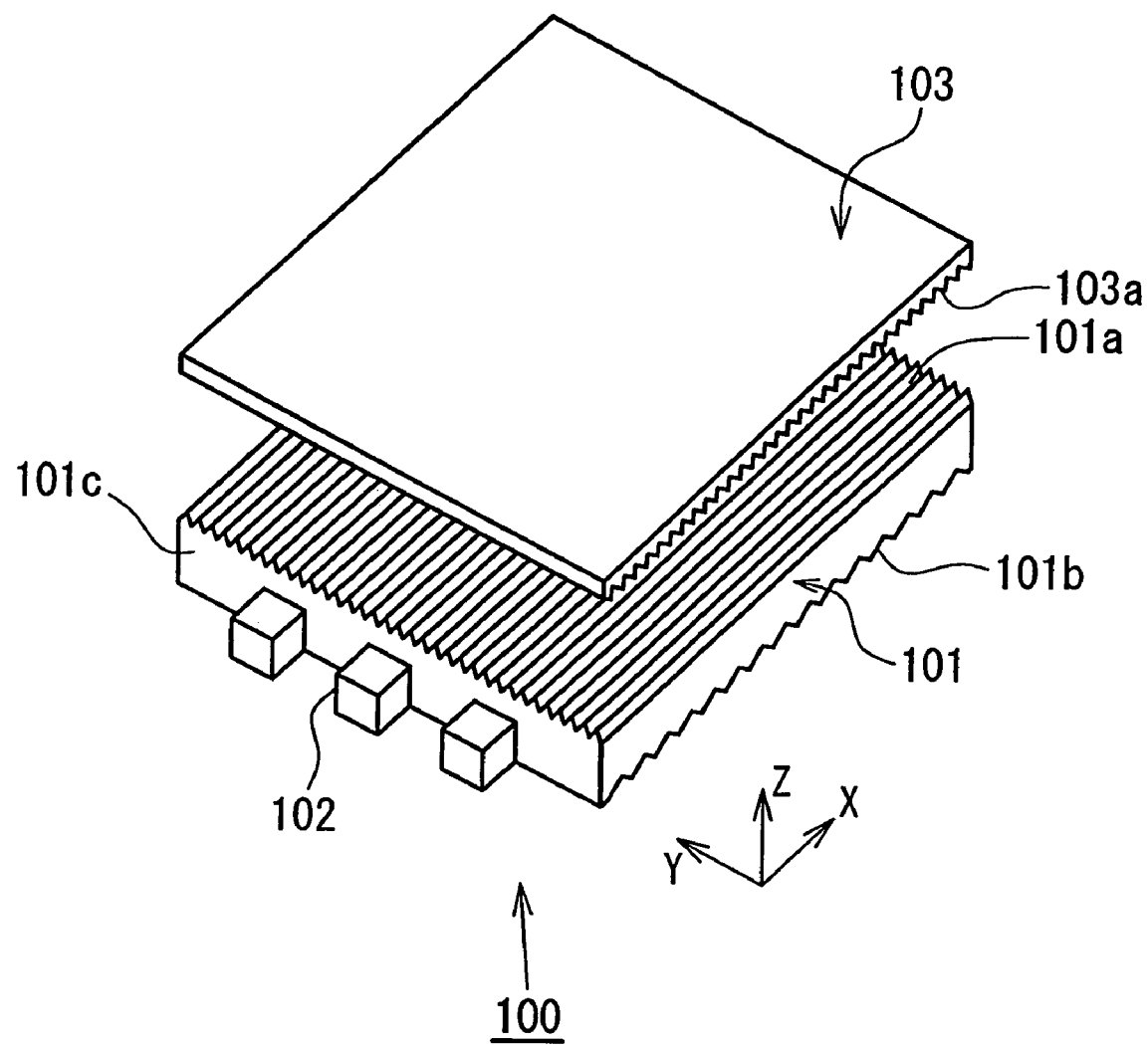
FIG. 5 is an exploded perspective view of a conventional spread illuminating apparatus.
Figure 6:
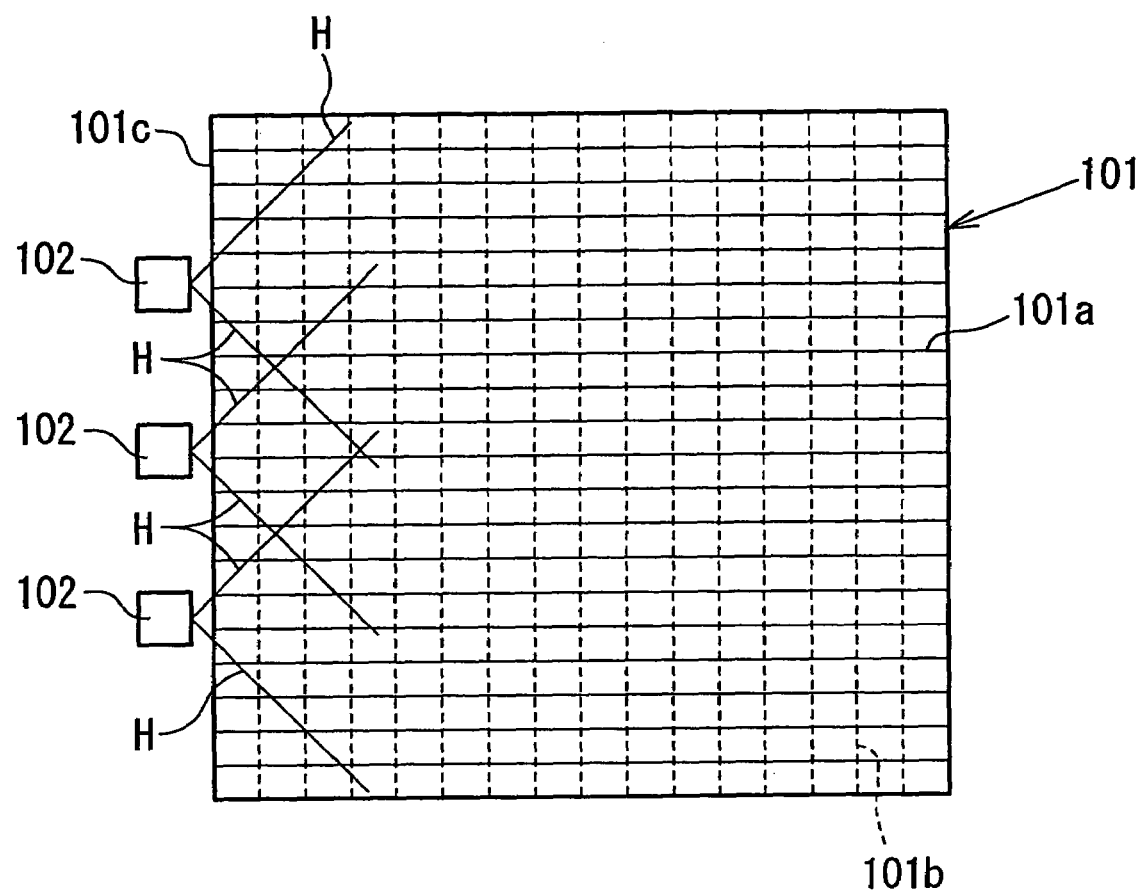
FIG. 6 is an explanatory view of emission lines appearing near a light entrance surface of a light conductive plate in the conventional spread illuminating apparatus of FIG. 5.

Further, the ridges 11d may have any configuration in cross section, for example, circular arc, triangle, hexagon, and the like. FIGS. 4A and 4B show cross-sectional views of the light conductive plate 11 of FIG. 1 taken along line A-A, where the ridges 11d are supposed to be sectioned orthogonally to the extending direction of respective ridges 11d. The ridges 11d may have the same cross-sectional configuration as shown in FIG. 4A, or may alternatively have respective cross-sectional configurations different from one another as shown in FIG. 4B. Also, the ridges 11d may be each spaced from the adjacent one at a constant interval, or may alternatively be each spaced variably from the adjacent one in a regular or random manner. In any case, the ridges 11d preferably have its height h measuring identical with one another.

In the above description, the crest lines of the ridges 11d are represented by curve lines meandering, but may alternatively be represented by any kinds of meandering lines that includes portions inclined with respect to the virtual straight line p (see FIG. 3), for example, polygonal lines. And, the ridges 11d are formed on one major surface of the light conductive plate11 in the embodiment, but may alternatively be formed on the other major surface, or on both of the major surfaces.

EXAMPLE

A cutting tool with a blade edge having a curvature radius of 35 μm was used for processing a molding die for manufacturing a light conductive plate. The cutting tool was held in a position to maintain a cutting depth of 20 μm from the reference surface, and a plurality of grooves which are all configured in a sine curve with an amplitude of 6 μm and a period of 500 μm (this configuration sets the maximum inclination angle of the curve at about 4 degrees) were cut with a constant processing interval, but with their phases shifted so that at least two adjacent curves are non-parallel to each other. A light conductive plate was manufactured using the molding die thus processed, and was incorporated in a spread illuminating apparatus. In the spread illuminating apparatus, emission lines were not perceived near a light entrance surface of the light conductive plate.

Obviously, many modifications and variations of the present invention are possible in light of the above teachings. Thus, it is to be understood that, within the scope of the appended claims, the invention may be practiced otherwise than as specifically described above.

What is claimed is:

1. A spread illuminating apparatus comprising:
   at least one spot light source; and
   a light conductive plate which comprises:
      a light entrance end surface at which the spot light is disposed;
      a light reflection surface constituted by one major surface of the light conductive plate, on which a regular reflection mechanism is provided, the regular reflection mechanism including a plurality of paired inclined surfaces which extend in a direction substantially parallel relative to the light entrance end surface and which are arrayed in a direction substantially orthogonal relative to the light entrance end surface; and
      a light exit surface constituted by the other major surface of the light conductive plate, on which a plurality of ridges are provided, the ridges extending in the direction substantially orthogonal relative to the light entrance end surface, wherein:
   the plurality of ridges meander in a plane parallel to the light exit surface;
   the plurality of ridges meander in accordance with an identical periodic function; and
   the plurality of ridges are each shifted in phase from each other so as to be arranged non-parallel to any adjacent ridge.

2. The spread illuminating apparatus according to claim 1, wherein the plurality of ridges have a maximum inclination angle ranging between 1 and 25 degrees with respect to a virtual line that extends in the direction orthogonal to the light entrance end surface.

3. The spread illuminating apparatus according to claim 1, wherein each ridge has a height that extends from the light exit surface, wherein the plurality of ridges are all identical in height.

4. The spread illuminating apparatus according to claim 1, wherein each ridge has a height that extends from the light exit surface, wherein the plurality of ridges are all about the same height.

5. The spread illuminating apparatus according to claim 1, wherein the plurality of ridges meander in accordance with a similar periodic function.

6. The spread illuminating apparatus according to claim 1, wherein the plurality of ridges have a maximum inclination angle of approximately 4 degrees with respect to a virtual line that extends in the direction orthogonal to the light entrance end surface.

* * * * *